(12) United States Patent
Hersh et al.

(10) Patent No.: US 6,311,930 B1
(45) Date of Patent: Nov. 6, 2001

(54) ANTI-FRICTION RELEASE DEVICE

(75) Inventors: Michael J. Hersh, Bethesda; Edward J. Devine, Laurel, both of MD (US)

(73) Assignee: Swales Aerospace, Beltsville, MD (US)

( * ) Notice: Subject to any disclaimer, the term of this patent is extended or adjusted under 35 U.S.C. 154(b) by 0 days.

(21) Appl. No.: 09/459,799

(22) Filed: Dec. 13, 1999

Related U.S. Application Data

(60) Provisional application No. 60/144,308, filed on Jul. 16, 1999.

(51) Int. Cl.[7] .................................................. B64G 1/44
(52) U.S. Cl. .................................. 244/158 R; 294/82.26; 244/173
(58) Field of Search ............................. 244/158 R, 161, 244/173, 137.4; 318/562; 294/82.26, 82.32, 82.3; 24/648; 89/1.51, 1.58, 1.59

(56) References Cited

U.S. PATENT DOCUMENTS

| | | | |
|---|---|---|---|
| 166,452 | 8/1875 | Brown et al. . | |
| 2,668,412 | 2/1954 | Abramson | 60/39.14 |
| 3,992,257 | 11/1976 | van Erp et al. | 176/36 C |
| 4,347,023 | 8/1982 | Rizos | 410/32 |
| 4,397,433 | 8/1983 | Guitaut et al. | 244/137 R |
| 4,419,033 | 12/1983 | Roth et al. | 410/32 |
| 4,682,804 | 7/1987 | Palmer et al. | 294/82.26 |
| 4,823,035 | 4/1989 | Kudla et al. | 310/68 C |
| 4,911,400 | 3/1990 | Gruber | 251/11 |
| 5,025,627 | 6/1991 | Schneider | 60/527 |
| 5,129,753 | 7/1992 | Wesley et al. | 403/322 |
| 5,221,171 | 6/1993 | Rudoy et al. | 411/433 |
| 5,377,554 | 1/1995 | Reulein et al. | 74/2 |
| 5,396,770 | 3/1995 | Petot et al. | 60/531 |
| 5,600,220 | * 2/1997 | Thoraval et al. | 318/562 |
| 5,695,306 | 12/1997 | Nygren, Jr. | 411/433 |
| 5,771,742 | 6/1998 | Bokaie et al. | 74/2 |
| 6,119,984 | * 9/2000 | Devine | 244/158 R |

FOREIGN PATENT DOCUMENTS

| | | |
|---|---|---|
| 0 441 669 A1 | 8/1991 | (EP) . |
| 2135796A | * 9/1984 | (GB) . |
| 07-223595 | 8/1995 | (JP) . |

OTHER PUBLICATIONS

XP–000952209, M. Lucy Et Al. Report on Alternative Devices to Pyrotechnics on Spacecraft Sep. 1996 p. 1–20.
Nygren May 1995, 29th Aerospace Mechanisms Symposium "Development of a High Force Thermal Latch".

* cited by examiner

*Primary Examiner*—Galen L. Barefoot
(74) *Attorney, Agent, or Firm*—Roberts Abokhair & Mardula, LLC

(57) ABSTRACT

A pin puller combines an actuator with an anti-friction release mechanism, according to a bilaterally symmetric geometry. The anti-friction tension release mechanism ensures that only negligible friction forces need to be overcome to operate the tension release mechanism. Thus, the actuator is isolated from the large tension force that bears on the tension release mechanism. The bilateral symmetric aspect of the structure provides for mechanical redundancy, so that, in the event that one half of the pin puller fails, it is sufficient that the other half operate properly for the tension to be successfully released. This pin puller avoids premature release because it is not susceptible to static electricity or electromagnetic radiation. The pin puller also avoids generation of large shock waves due to its slow speed of operation and because of the gradual release interaction of mechanical parts within the anti-friction release mechanism.

20 Claims, 5 Drawing Sheets

ANTI-FRICTION RELEASE DEVICE

RELATED APPLICATIONS

The present application is related to U.S. patent application Ser. No. 09/356,200, by Edward J. Devine, filed on Jul. 16, 1999.

The present application claims priority under 35 U.S.C. § 119 from U.S. Provisional Patent Application No. 60/144,308 filed on Jul. 16, 1999.

BACKGROUND OF THE INVENTION

1. Field of the Invention

The present invention is directed to the field of devices for restraining and selectively releasing a tension force. More particularly, the present invention is directed to the field of devices that deploy folded structures on a spacecraft after launch.

2. Background Information

It is common in the space industry to launch a spacecraft with some of its parts folded down against the exterior of the spacecraft. For example, when the spacecraft is a solar powered earth satellite, the large solar panels must be folded down so that the spacecraft can fit inside the payload space of a launch vehicle. Antennae, sensors, and nuclear power plants (mounted on extensible members) are examples of other bulky appendages that may need to be folded down to the side of a spacecraft during launch.

After the spacecraft has been placed in space, the folded parts must then be reliably deployed. Typically, this is done via a spring bias that tends to urge the folded part into an extended position. During launch, a retention member, which will later be released upon a remote command, counters the spring bias. The retention member is commonly referred to in the art as the "pin," although it sometimes is not literally in the form of a pin. The tension release device that releases the retention member (or pin) is commonly known in the art as the "pin puller."

Pyrotechnic devices have been long used as tension release devices. Commonly known as exploding nuts or exploding bolts, pyrotechnic devices are a mature technology that has the advantages of providing for very secure retention of folded structures and deploying reliably, that is, they are mechanically strong and have a low failure rate.

One disadvantage of pyrotechnics is that they are susceptible to premature firing. Static electricity and electromagnetic radiation can accidentally set them off. Premature firing causes untimely deployment of folded parts and other potentially catastrophic results. Thus, these prior art tension release devices are risky due to their tendency to prematurely actuate as a result of ambient conditions.

Another disadvantage common to the prior art tension release (i.e., pin puller) schemes is that they are high shock devices. Pyrotechnic devices, by their very nature, explode. The explosion sends mechanical shock waves all through the spacecraft. In addition, they impart subtle forces on the orbital mechanics of the vehicle. These shock waves place additional stress on the spacecraft that can only increase the risk of failure of delicate systems aboard the spacecraft, such as electronic circuits, electrical connectors, and optical sensors.

Another approach to tension release devices has been paraffin actuators. Upon receiving a remote command the paraffin actuator develops a linear mechanical force to actuate a release mechanism, thereby deploying the folded parts of the spacecraft. The paraffin actuator operates based on the phenomenon that when paraffin changes from solid phase to liquid phase it undergoes a substantial expansion. A cylindrical slug of solid paraffin is loaded in a cylinder with a piston disposed against it. When a remote deployment command is received, heat is applied to the cylinder containing the paraffin, causing the paraffin to undergo a phase change. The resulting expansion of the paraffin forces the piston to move through the cylinder and develops a mechanical force. Pin pullers based on paraffin actuators also generate shock waves due to the suddenness with which the restraining force is released.

A failed attempt at improving on the above devices involved the use of a low temperature melting point metal alloy as a fusible link in the tension release device. This device was initially described by William D. Nygren. "Development of a High Force Thermal Latch" 29$^{th}$ Aerospace Mech. Symposium, May 17–19, 1995. This device is also described in U.S. Pat. No. 5,695,306. Upon receiving a remote command for deployment, heat was applied to the fusible link 100 (or 300) so that it would melt, thereby causing the tension release device to undergo a mechanical shift so as to permit release of the pin. This system failed because the fusible link 100 (or 300) was directly bearing more force than it could handle. The fusible link 100 (or 300) was unable to withstand the mechanical forces exerted on it and, thus, the fusible link 100 (or 300) tended to flow prematurely due to tension forces alone. Accordingly, this prior art tension release device is not commercially viable. The force that a tension release device must restrain is on the order of several thousand pounds, typically 5,000 to 10,000 pounds, for a folded solar panel array.

Another prior art tension release device is disclosed in published EPO patent application no. 0 441 669. This tension release device restrains a pin 8 that is holding down folded solar panels 3A, 3B on a spacecraft 4. The pin 8 is held in place by balls 12a, 12b, 12c which are in turn held in place by a circular cam 16. When pyrotechnic devices 23 ignite, the restraint pin 22 is removed so that the cam 16 is free to rotate and thereby move the balls 12a, 12b, 12c downward and release the pin 8. By its use of pyrotechnic devices, it is clear that this invention does not contemplate solving either the problem of premature actuation or the problem of generation of large shock waves.

Thus, what is needed is a tension release device (i.e., pin puller) that operates reliably, that avoids premature actuation, and that avoids generation of large shock waves due to sudden actuation.

SUMMARY OF THE INVENTION

It is an object of the present invention to provide a tension release device that operates reliably.

It is another object of the present invention to provide a tension release device that avoids premature operation.

It is a further object of the present invention to provide a tension release device that avoids generation of large shock waves.

It is still another object of the present invention to provide a spacecraft with one or more folded appendages, wherein the appendages unfold reliably.

It is yet another object of the present invention to provide a spacecraft with one or more folded appendages, wherein premature unfolding of the appendages is avoided.

It is a further object of the present invention to provide a spacecraft with one or more folded appendages, wherein generation of large shock waves is avoided when the appendages are unfolded.

It is yet another object of the present invention to provide an actuator that develops an actuation force based on a phase change of a metal alloy.

It is yet another object of the present invention to provide an actuator that develops an actuation force reliably, avoids premature actuation, and avoids generation of large shock waves upon actuation.

To achieve the above objects, the present invention is embodied as a tension release device that combines an actuator with an anti-friction release mechanism, according to a bilaterally symmetric geometry. One aspect of a release device according to the present invention is an anti-friction release mechanism. Because negligible friction forces need to be overcome to operate the anti-friction release mechanism, the actuator is isolated from the large tension force that bears on the release mechanism.

Still another aspect of a tension release device according to the present invention is a bilateral symmetric structure that provides for mechanical redundancy. In the event that one half of the tension release device fails, it is sufficient that the other half operate properly for the tension to be successfully released.

To obtain certain of the above objects of the invention, a tension release device is provided that retains a pin that is subject to a tension force and for releasing the pin on command. The tension release device includes an actuator and an anti-friction release mechanism. The actuator develops a force at a selected time, based on a phase change of an expandable material or metal alloy contained in the actuator. The anti-friction release mechanism retains the pin until the selected time, whereupon it releases the pin in response to the force developed by the actuator.

To obtain some of the above objects of the invention, a tension release device is provided that retains a pin that is subject to a tension force and for releasing the pin on command. The tension release device includes an actuator and an isolation structure. The actuator develops an actuation force at a selected time, based on a phase change of an expandable material or metal alloy contained in the actuator, the actuation force having a substantially smaller magnitude that the tension force. The isolation structure substantially isolates the actuator from the tension force so that the pin is released in response to the comparatively small actuation force.

To obtain others of the above objects of the invention, a spacecraft is provided that includes a main body, an appendage attached to the periphery of the main body, and a tension release device attached to the periphery of said main body. The tension release device initially maintains the appendage in a folded configuration and releases the appendage to unfold at a selected time after the spacecraft has been placed into space. The tension release device includes an actuator and an anti-friction release mechanism. The actuator develops a force at a selected time to release the pin. The anti-friction release mechanism retains the appendage via a pin until the selected time, whereupon the anti-friction release mechanism releases the pin in response to the force developed by the actuator.

In one embodiment, the invention comprises an actuator that provides for a linear actuation motion at a selected time. The actuator includes a cylinder having an end wall, a piston disposed inside the cylinder, and a mass expandable material in the actuator chamber. The actuator also includes a heat source, disposed adjacent to the cylinder, for generating heat when energized at the selected time so as to melt the mass of expandable material and thereby drive the piston out of the actuator. As a result, the piston moves and provides the linear actuation motion.

BRIEF DESCRIPTION OF THE DRAWINGS

Other objects and advantages of the present invention will become clear as the invention is described below, with reference to the drawings in which.

DETAILED DESCRIPTION OF THE INVENTION

Figure 1:
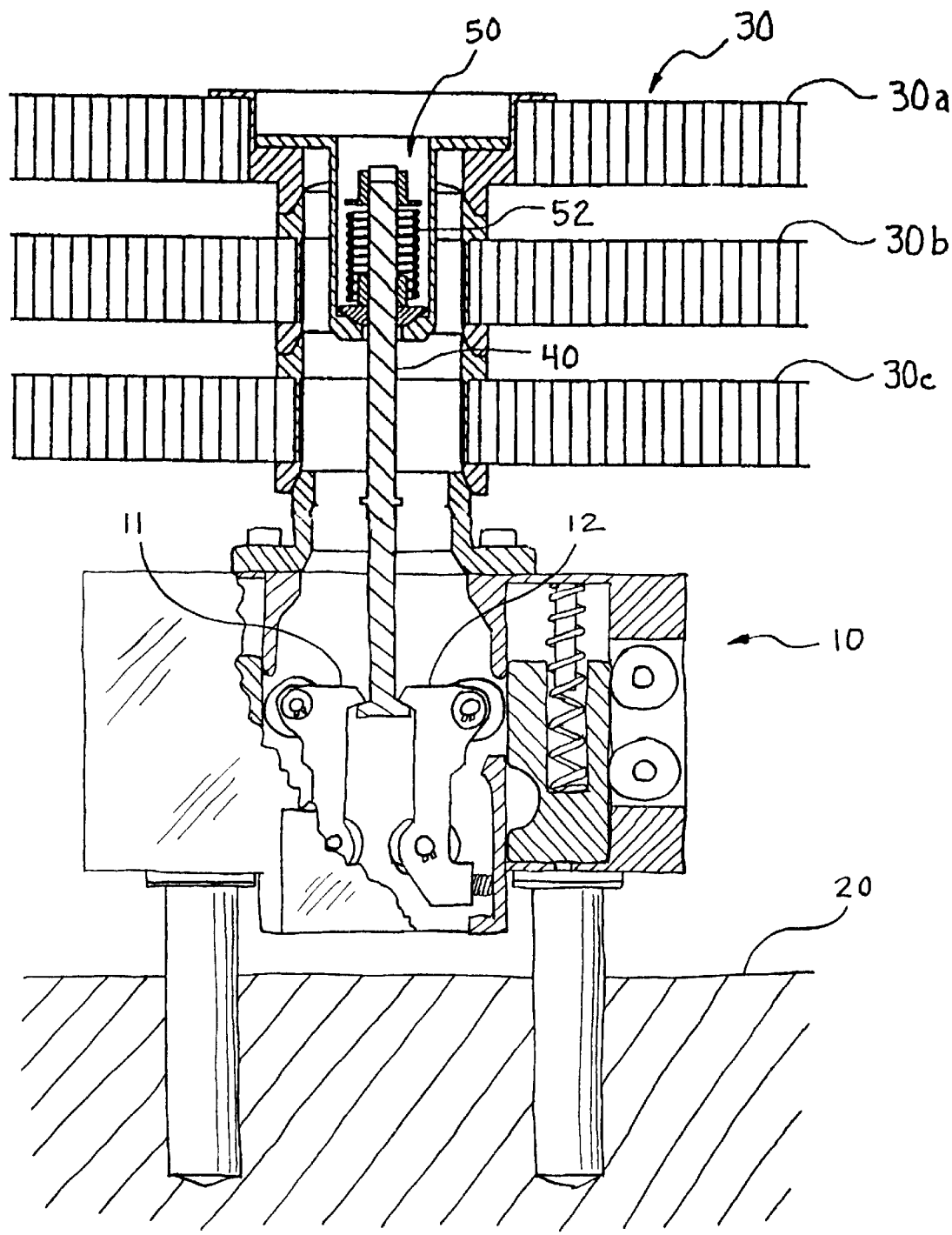
FIG. 1 illustrates a partial cross-sectional view of a pin puller according to an embodiment of the present invention, disposed beneath a folded solar panel array.

Referring to FIG. 1, a pin puller 10 according to the present invention is shown, installed on a spacecraft 20. A solar array 30 is folded into a first segment 30a, a second segment 30b, and a third segment 30c. The solar array, as illustrated has three segments. Generally, though, the solar array may be configured to have only two segments or a single segment or greater than three or more segments. A pin 40 is connected to the third or outermost segment 30c of the solar array 30, and projects down through the second and first segments 30b, 30a to engage the pin puller 10. The pawls 11, 12 of the pin puller 10 directly engage the pin 40 to hold the solar array 30 in a folded position.

The pin 40 is connected to the third or outermost segment 30c by a pin retraction mechanism 50. When the pin puller 10 operates to release the pin 40, the pin retraction mechanism 50 functions to retract the pin 40 through the third segment 30c to prevent the pin 40 from binding with either of the first and second segments 30a, 30b. The pin 40 is retracted by means of the force exerted by compressed spring 52 as it expands.

Figure 1A:
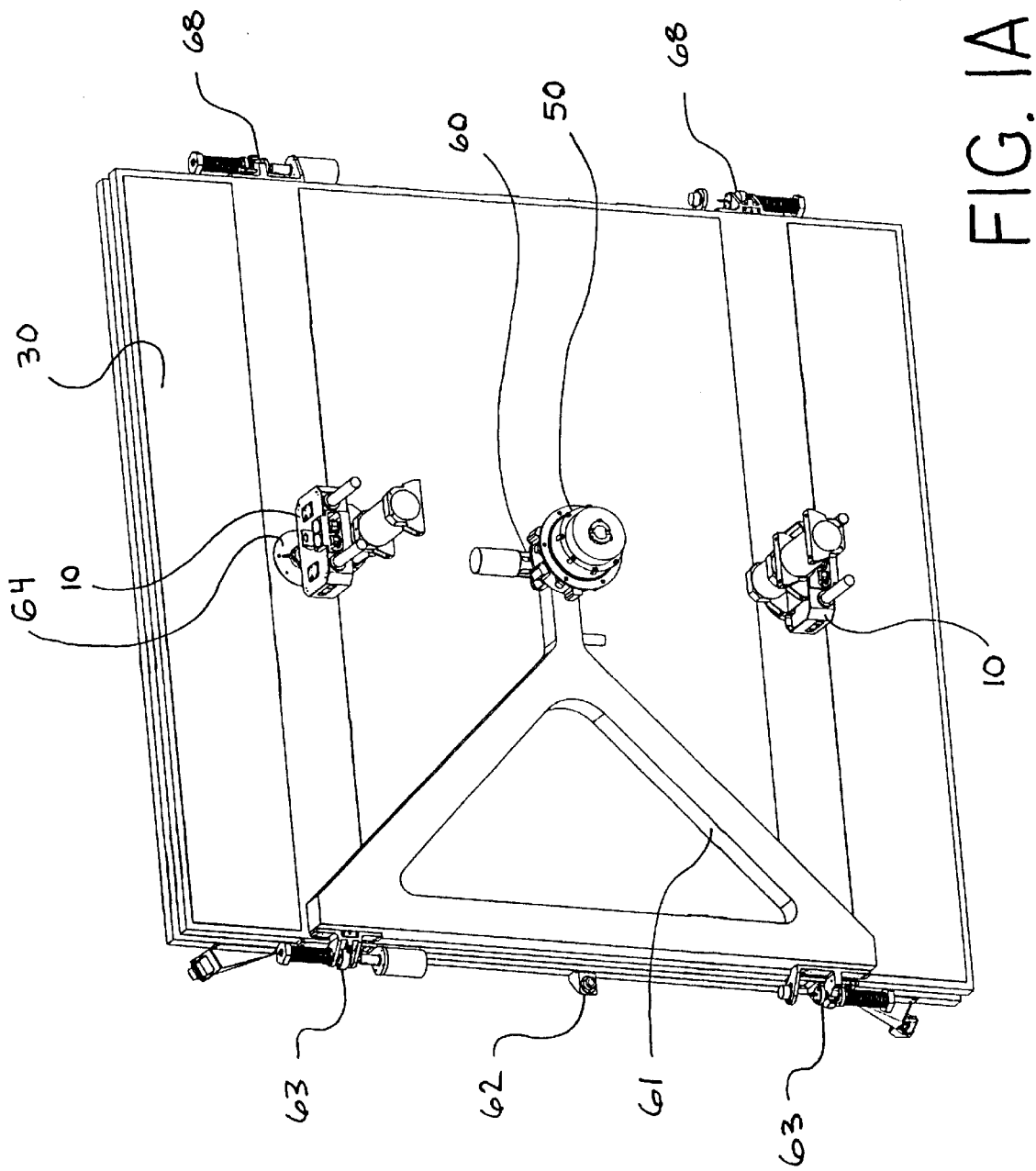
FIG. 1A illustrates a perspective view of a solar panel array in combination with two pin puller devices according to an embodiment of the present invention.

Referring to FIG. 1A shows an overview of one embodiment of the present invention. A solar array 30 in a compressed or folded position is shown. Two restraint/release systems 10 are shown in this embodiment, with each mounted on a solar panel insert 64. A yoke 61 is shown attached to the solar array drive assembly 50. Deployment hinge 60 is shown as part of the solar array drive assembly. The solar array 30 is hinged to the yoke 61 by hinges 63, and the separate panels of the solar array 30 are hinged to one another by hinges 68. These hinges 63, 68 are designed to have sufficient force to deploy the solar panels when the restraint/release system 10 is engaged to remove the restraining pin. A sun sensor 62 is shown. Various hinges 63, 68 are known in the art and can be utilized. In one embodiment, the hinges 63, 68 contain sufficient force to deploy the solar array 30. Additionally, the hinges comprise means to control the movement or the speed of deployment of the panels. Dampers may be utilized as part of the hinge assembly.

Figure 2:
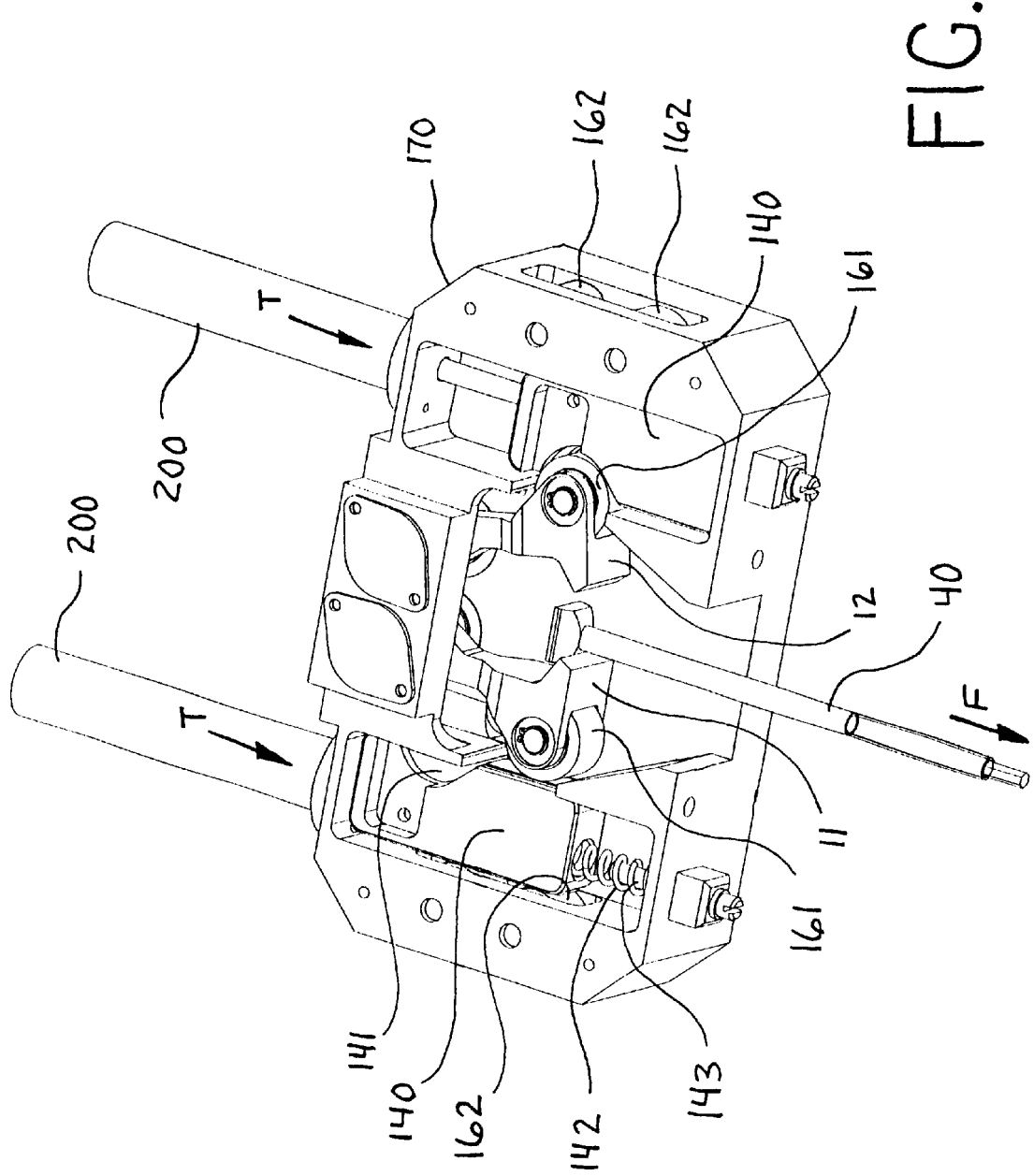
FIG. 2 illustrates a perspective detail view of a pin puller according to an embodiment of the present invention, with a portion of the housing removed so as to show the tension release mechanism aspect of the pin puller.
Figure 3:
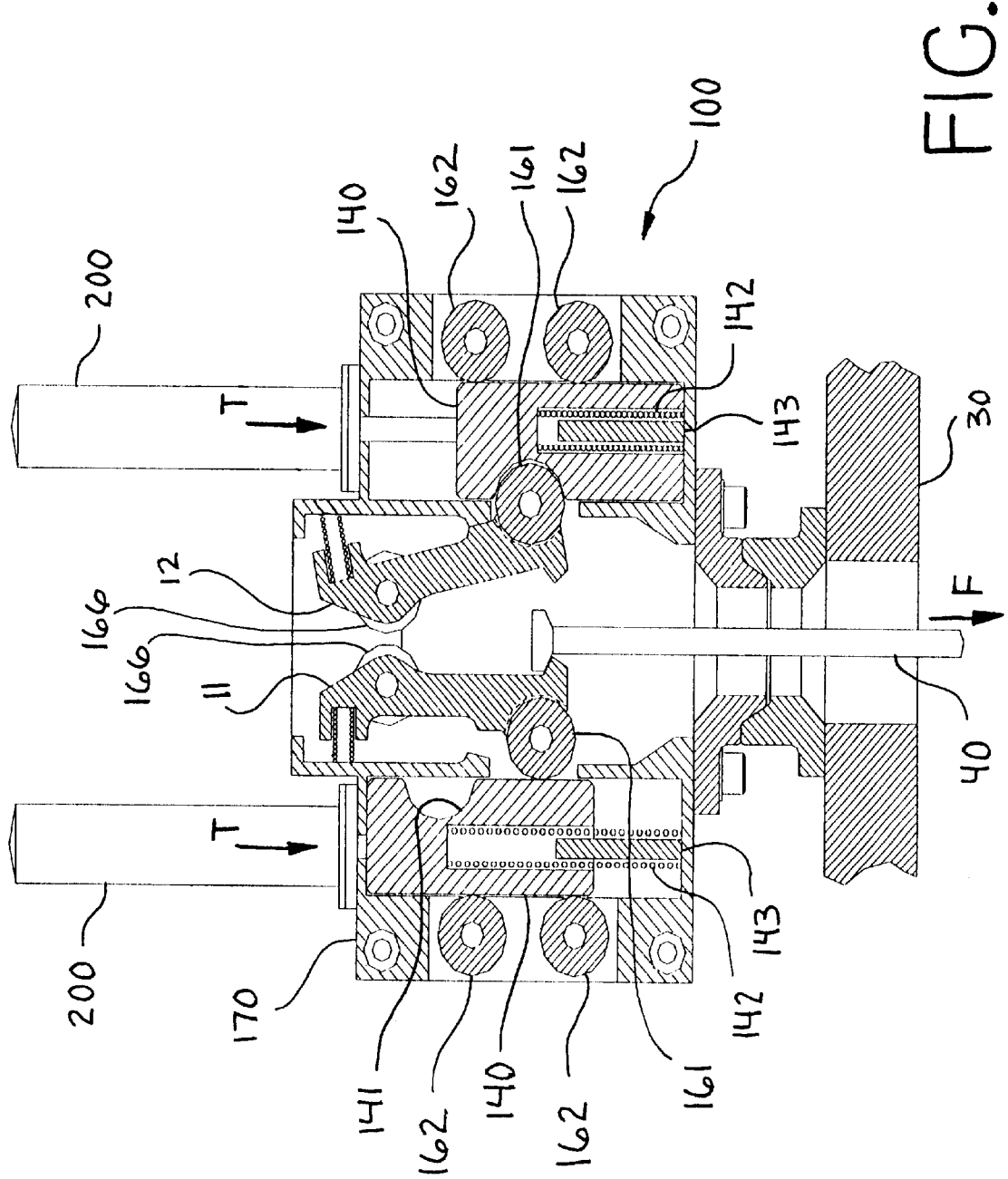
FIG. 3 illustrates a cross-section view of the tension release mechanism aspect of a pin puller according to an embodiment of the present invention.

The anti-friction tension release aspect of the invention is illustrated in FIG. 2, which shows a perspective view of the tension release mechanism inside the pin puller with a housing cover removed, and in FIG. 3. which shows a cross-sectional view of a portion of the tension release mechanism. This aspect of the invention is described as follows.

Two pawls 11, 12 hold a pin or restraint rod 40 in place against a force F tending to pull on the pin 40. In a typical application, the pin 40 is holding down a furled solar array 30 (see FIG. 1 and FIG. 1A) to the side of a spacecraft 20 (see FIG. 1). At an appropriate time (e.g., when orbit has been achieved), the tension release mechanism acts to release the pin 40 to move in response to the force F, thereby permitting the solar array 30 to unfurl.

FIG. 2 and FIG. 3 show an embodiment that has bilateral symmetry. The right side shows the assembly in the release position while the left side shows the stowed position. This gives the system redundancy in that the pin will be released even if only one side functions properly. The function of the both sides is identical, except they operate in mirror image. Either of the two sides may be eliminated and a fixed member substituted in place of the pawl for that side.

When a force T (from the actuators) is input to the release device, the shuttle 140 moves in the direction of the force towards the solar panels. The movement of the shuttle 140 is guided by two bearings 162, 161. The actuator 200 has to exert sufficient force T to overcome the force in the shuttle spring 142 and the resistance caused by bearings 162 and 161. A pin 143 guides the shuttle spring 142. The shuttle movement is, as a practical matter, about one inch or less. On the one hand, it is preferred to make this distance as long as practicable in order to minimize the possibility that launch vibration will cause inadvertent actuation. On the other hand, this distance is constrained depending upon the throw of the actuator being used.

When the shuttle 140 has moved down a sufficient distance, cavity 141 in the shuttle houses bearing 161, which is attached to the pawl 11. The pawl moves down into cavity 141, thus releasing the restraint rod or pin 40. As shown in FIG. 3, pawls 11 and 12 pivot around hinge 166. According to a preferred embodiment, the hinges 166 are embodied as needle bearing pivots. However, the use of bearings for the hinges 166 is not necessary to practice the invention, and is considered an option.

The anti-friction aspect of the tension release mechanism 100 is due to the configuration of three anti-friction bearings 161 and 162 (refer to FIG. 3) that provide friction relief between the shuttle 140, and the housing 170. Bearing 161 provides for a rolling interaction between the pawls 11 and 12 and the shuttle 140, and bearings 162 provide for a rolling interaction between the shuttle 140 and the housing 170. Thus, there is no sliding friction to overcome when the shuttle 140 starts to move. The only resistance to movement is rolling resistance of the three bearings 161 and 162 and the force of the shuttle return spring 142. Spring 142 is of minimal force to prevent accidental movement of shuttle 140. This is important because the force F that loads the tension release mechanism is much greater than the tension force T used to actuate the release. Thus, the rolling resistance of three ball bearings is negligible compared to the prior art alternative: the resistance that would be provided by a sliding friction force.

The two outer bearings 162 roll only against the shuttle 140 and the bearing 161 rolls only against the shuttle 140. As illustrated, the outer race of none of the bearings contact the housing 170.

As illustrated, the bearings each have an outer race and plural rolling elements that are disposed between the shaft (which acts as an inner race) and the outer race. The rolling elements are preferably formed of a ceramic material. Silicon nitride is a preferred ceramic material for the rolling elements. The differing materials arc chosen so as to minimize friction while avoiding the need for a lubricant.

According to an alternate embodiment, the bearing parts are all metal. In this case a lubricant is used. For use aboard a satellite, the lubricant is selected from the class of space lubricants which are well known to those who work in that art.

According to an alternate embodiment, each of the bearings has its own distinct inner race that is fitted over the shaft, rather than using the shaft itself as an inner race common to all the bearings.

The preferred type of bearing is a cam follower. As an alternative to the cam follower, a needle bearing, which has rollers as rolling elements, may be used. A cam follower differs from a needle bearing in that its outer race is thicker, and therefore better able to withstand without deflection a point (or line) force. The needle bearing is useful if it is desired to minimize the size of the bore, since a needle bearing is preferred for fitting into a close fitting bore. The particular rolling elements used may be either cylindrical rollers or balls. Rollers generally offer greater load capacity that similarly sized balls. On the other hand, ball rolling elements generally have lower friction that rollers. The inner and outer races are both preferably formed of a corrosion resistant metal such as stainless steel.

Figure 4:
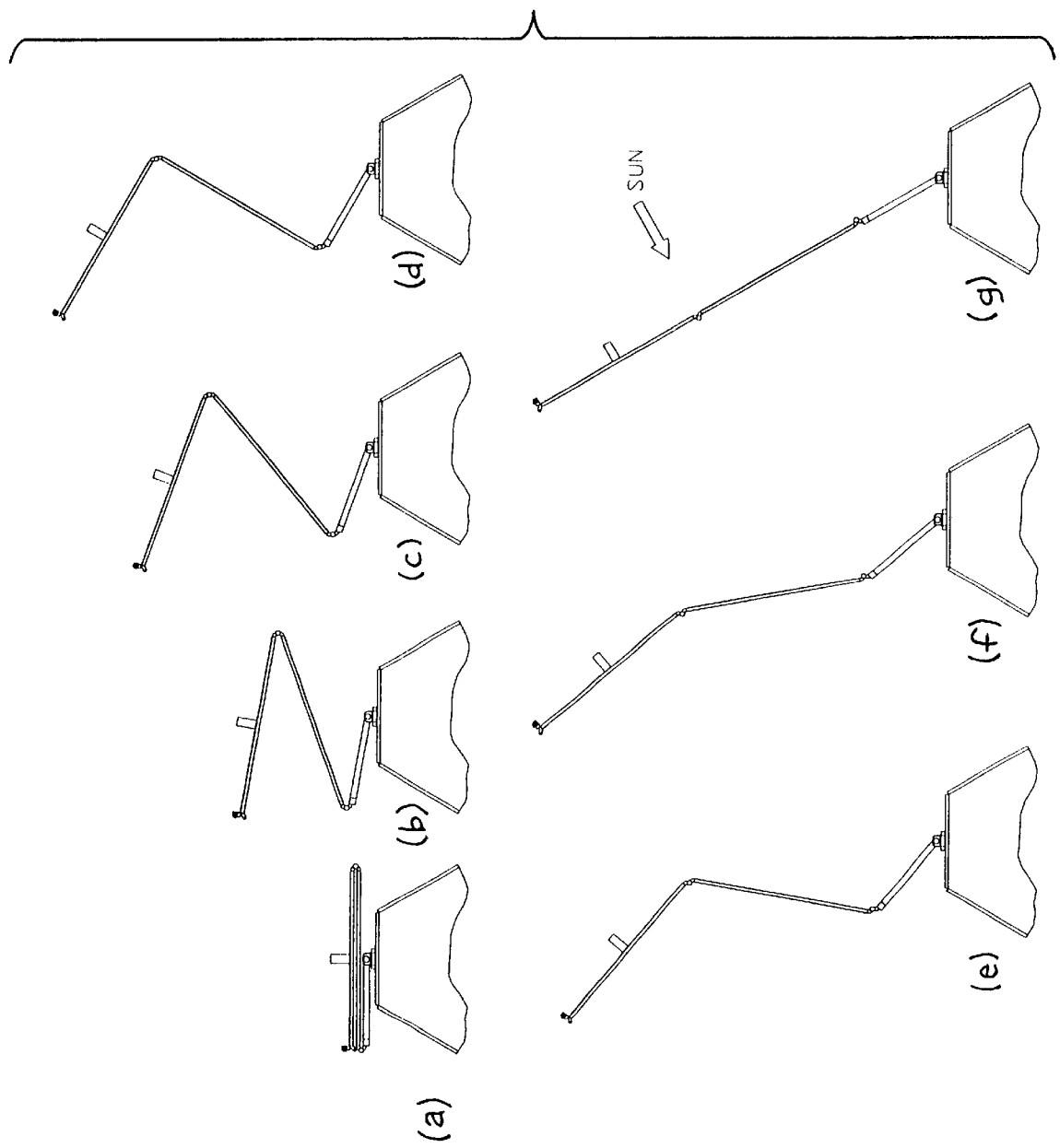
FIG. 4 illustrates a deployment sequence of a solar array utilizing an embodiment of the present invention.
Figure 1A:
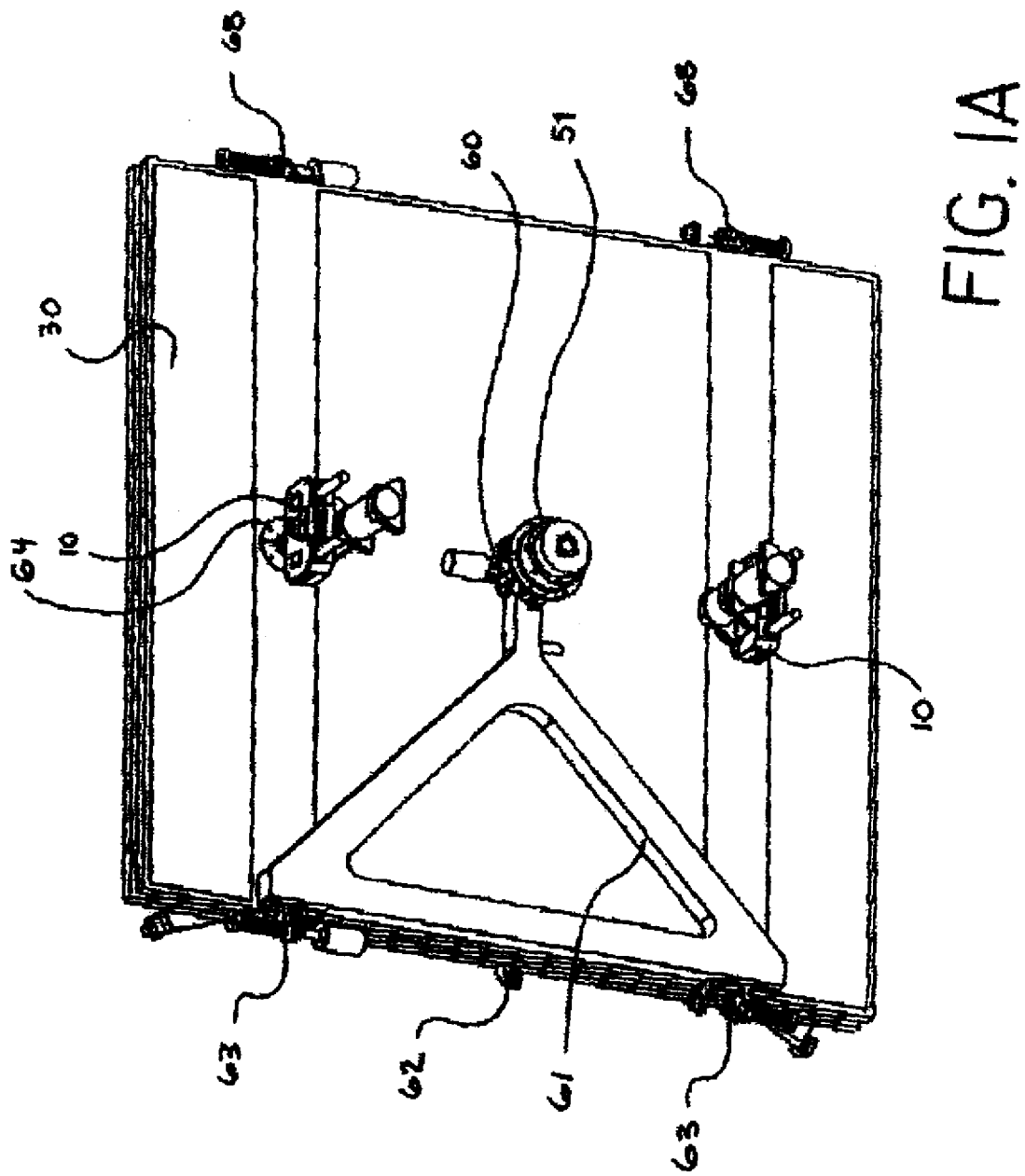

Referring to FIG. 4, deployment of a solar array is illustrated according to a sequential representation. In part (a), the solar array is shown in the furled position, being held in place by a restraint rod and pin puller. Upon release of the restraint rod (or pin), the solar array begins to unfurl as shown in part (b). Parts (c), (d), (e), and (f) show the progressive deployment of the solar array. The fully deployed position of the solar array is shown in part (g).

The tension force T for operating the tension release mechanism is provided by the actuator 200. The actuator type is selected from various known types. Those familiar with the art recognize that metal alloy actuators, paraffin actuators, and the like, may be utilized. The requirement is that the actuator provide sufficient force T to move the shuttle 140 a sufficient distance against the minimal resistance of the bearings and the shuttle return spring. The paraffin actuators utilize the change in volume of a paraffin in a chamber inside the actuator to drive a piston in one direction or the other. The expansion in the volume of the paraffin pushes a piston in the desired direction for the movement of the shuttle 140. Paraffin actuators can be utilized more than once by removing the heat source from the paraffin.

Metal alloy actuators can also be utilized in the present invention. However, metal alloy actuators are utilized for one time only. A low melting metal alloy is utilized to hinder the movement of a piston. Energy is stored mechanically in a spring, which drives the piston in the desired direction once the metal alloy is removed. Heaters are utilized to melt the low melting metal alloys and the molten alloy is removed from the chamber, thus eliminating the resistance of the piston. The melting point of the metal alloy is chosen to be safely above any foreseeable ambient temperature to which spacecraft will be exposed. For application in the context of a spacecraft, the melting temperature of the alloy is preferably in the range of about 100° C. to about 150° C. Optimally, the melting temperature of the alloy is approximately 125° C. For spacecraft applications, the eutectic alloy of bismuth (55.5%) and lead (44.5%) gives an optimal melting point of 123.8° C. Other alloys or materials could be employed for other operating temperatures.

The present invention makes possible a substantial weight savings because the actuator can be made much smaller than comparable actuators in the prior art. Since no static friction forces (other than the negligible rolling resistance of the bearings) and the mirror shuttle return spring force need to be overcome to release the retained pin, the actuator only needs to develop a relatively small tension force T. The relative difference in force magnitude is approximately two orders of magnitude. Accordingly, since it develops a small force, the actuator can be made physically smaller, and thus, lighter than in prior art pin pullers.

The release device as described herein generates shock waves that are greatly reduced compared with prior art devices. Generation of shock waves is reduced primarily because the release is done gradually. There are two features of the release device that make the release gradual.

One is the fact that the actuator 200 moves slowly as a result of the fact that heat is applied to the internal medium to allow movement of the piston.

The other feature that contributes to the gradual nature of the release action of the release device is the mechanical interaction between the pawl 12 and the bearing 161 with the cavity 141. As the bearing 161 begins to enter the cavity 141, the initial phase of the rotation of the pawl 12 is slow while the extreme tip of the pawl 12 follows the receding curve of the periphery of the cavity 141. By the time bearing has receded all the way into cavity 141, the tension in the pin 40 will already have been gradually released by the rotation of the pawl.

In addition to the redundancy of having two actuators (the bi-lateral symmetry feature), reliability is further enhanced by the use of plural heaters for each of the actuators. In the event that one of the heaters fails, the heat provided by the remaining heater will be sufficient to melt the metal alloy or paraffin, albeit more slowly than if both were operational.

The heaters are preferably thin, flexible Kapton resistance heaters. The heaters need not necessarily be Kapton heaters. Other types of resistance heaters are appropriate for use in the present invention. Generally, any compact, reliable heat sources are appropriate.

The present invention is not limited to space applications and is useful in any context where a tension force is to held reliably and then released reliably at a selected time.

The present invention is described above in terms of a preferred embodiment. However, it will be appreciated by persons of skill in the art that various modifications and improvements may be made to the described embodiment without departing from the scope of the invention as disclosed. The invention is limited only by the appended claims.

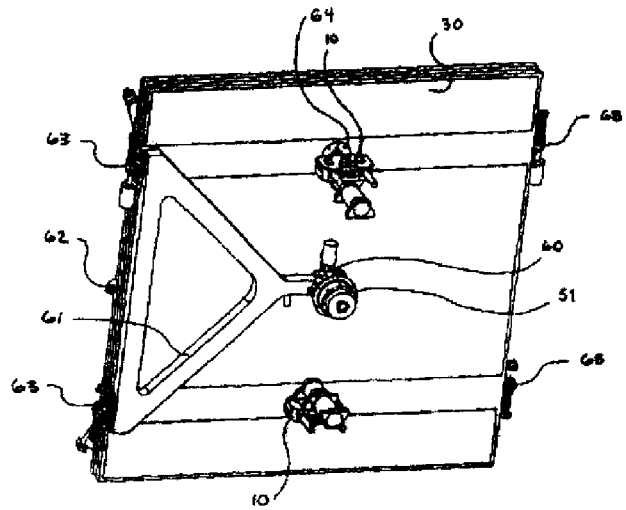

What is claimed is:

1. A tension release device for retaining a pin subject to a tension force and for selectively releasing the pin, the tension release device comprising:
   an actuator that develops a force at a selected time, based on a phase change of a substrate contained in the actuator,
   a shuttle connected to the actuator wherein the shuttle comprises a front part and a rear part, wherein an indentation is formed in the rear part,
   a pawl in combination with a pawl bearing, wherein the bearing provides a rolling engagement between the shuttle and the pawl,
   wherein, prior to the activation of the actuator, the pawl is held against the pin by engagement of the front end of the shuttle against the pawl bearing, and
   wherein, upon activation of the actuator, the shuttle moves away from the actuator to engage the pawl bearing in the indentation and release the pawl from the pin.

2. The tension release device of claim 1, wherein the actuator comprises:
   a cylinder having an end wall;
   a piston disposed inside the cylinder;
   a spring disposed so as to bias the piston to move toward the end wall;
   a mass of metal alloy, as the substrate, disposed between the piston and the end wall; and
   a heat source disposed about the cylinder.

3. The tension release device of claim 2, wherein composition of the metal alloy is selected so that the metal alloy has a melting temperature greater than foreseeable ambient temperatures.

4. The tension release device of claim 3, wherein the melting temperature is in the range of about 100° C. to 150° C.

5. The tension release device of claim 2, wherein the metal alloy is comprised essentially of lead and bismuth.

6. The tension release device of claim 2, wherein the heat source, when energized, raises the temperature of the mass of metal alloy above the melting point of the metal alloy.

7. The tension release device of claim 6, wherein the mass of metal alloy is solid phase prior to the heat source being energized, and the mass of metal alloy changes from solid phase to liquid phase when the heat source is energized; and
   wherein the liquid phase mass of metal alloy flows out of the space between the piston and the end wall, thereby permitting the piston to move toward the end wall.

8. The tension release device of claim 2, wherein the heat source comprises plural independent heating elements.

9. The tension release device of claim 1, wherein the pawl rotates away from the initial position when the shuttle moves in response to the force developed by the actuator, thereby releasing the pin.

10. The tension release device of claim 1, wherein the actuator is a paraffin actuator or a metal alloy actuator.

11. The tension release device of claim 1, wherein the shuttle is directed along a movement path by two bearings that engage the shuttle on a side that is opposed to the side engaged by the pawl bearing.

12. A spacecraft comprising:
   a main body;
   an appendage attached to a periphery of the main body; and
   a tension release device attached to a periphery of the main body, the tension release device initially maintaining the appendage in a folded configuration and releasing the appendage to unfold at a selected time after the spacecraft has been placed into space;
   wherein the tension release device comprises:
      an actuator that develops a force at a selected time, based on a phase change of a substrate contained in the actuator,
      a shuttle connected to the actuator wherein the shuttle comprises a front part and a rear part, wherein an indentation is formed in the rear part, and
      a pawl in combination with a pawl bearing, wherein the bearing provides a rolling engagement between the shuttle and the pawl, wherein, prior to the activation of the actuator, the pawl is held against the pin by engagement of the front end of the shuttle against the pawl bearing, and wherein, upon activation of the actuator, the shuttle moves away from the actuator to engage the pawl bearing in the indentation and release the pawl from the pin.

13. The spacecraft of claim 12, wherein the actuator comprises:
   a cylinder having an end wall;
   a piston disposed inside the cylinder;
   a spring disposed so as to bias the piston to move toward the end wall;
   a mass of metal alloy, as the substrate, disposed between the piston and the end wall; and
   a heat source disposed about the cylinder.

14. The spacecraft of claim 13, wherein the heat source, when energized, raises the temperature of the mass of metal alloy above the melting point of the metal alloy.

15. The spacecraft of claim 12, wherein the shuttle is directed along a movement path by two bearings that engage the shuttle on a side trot is opposed to the side engaged by the pawl bearing.

16. A tension release device for retaining a pin subject to a tension force and for selectively releasing the pin, the tension release device comprising:
   a first release mechanism, and
   a second release mechanism, the pin being retained by engagement with both the first and second release mechanisms;
   wherein each of the first and second release mechanisms comprise:
      an actuator that develops a force at a selected time, based on a phase change of a substrate contained in the actuator,
      a shuttle connected to the actuator wherein the shuttle comprises a front part and a rear part, wherein an indentation is formed in the rear part, and
      a pawl in combination with a pawl bearing, wherein the bearing provides a rolling engagement between the shuttle and the pawl, wherein, prior to the activation of the actuator, the pawl is held against the pin by engagement of the front end of the shuttle against the pawl bearing, and wherein, upon activation of the actuator, the shuttle moves away from the actuator to engage the pawl bearing in the indentation and release the pawl from the pin;
   wherein the first and second release mechanisms provide redundancy of mechanism for pin release wherein either release mechanism operated alone is sufficient to release the pin.

17. The tension release device of claim 16, wherein, for each of the first and second release mechanisms, the substrate comprises a metal alloy selected so that the metal alloy has a melting temperature greater than foreseeable ambient temperatures.

18. The tension release device of claim 17, wherein the melting temperature is in the range of about 100° C. to 150° C.

19. The tension release device of claim 17, wherein the metal alloy is comprised essentially of lead and bismuth.

20. The tension release device of claim 14, wherein, for each of the first and second release mechanisms, the shuttle is directed along a movement path by two bearings that engage the shuttle on a side that is opposed to the side engaged by the pawl bearing.

* * * * *

UNITED STATES PATENT AND TRADEMARK OFFICE
CERTIFICATE OF CORRECTION

| | |
|---|---|
| PATENT NO. | : 6,311,930 B1 |
| APPLICATION NO. | : 09/459799 |
| DATED | : November 6, 2001 |
| INVENTOR(S) | : Michael J. Hersh et al. |

It is certified that error appears in the above-identified patent and that said Letters Patent is hereby corrected as shown below:

The title page, showing an illustrative figure, should be deleted and substitute therefore the attached title page.

The sheet of drawing consisting of figure 1A should be deleted and substitute therefore the attached sheet.

| | | | |
|---|---|---|---|
| | COLUMN 2, | LINE 16, | change "Nygren." to --Nygren,--. |
| | COLUMN 3, | LINE 42, | at the beginning of the line, change "that" to --than--. |
| | COLUMN 4, | LINE 52, | change "assembly 50" to --assembly 51--. |
| | COLUMN 6, | LINE 4, | change "arc" to --are--. |
| | COLUMN 6, | LINE 25, | at the beginning of the line, change "that" to --than--. |
| | COLUMN 6, | LINE 26, | after "friction" change "that" to --than--. |
| CLAIM 15, | COLUMN 9, | LINE 22, | change "trot" to --that--. |

Signed and Sealed this

Ninth Day of June, 2009

JOHN DOLL
*Acting Director of the United States Patent and Trademark Office*

(12) United States Patent
Hersh et al.

(10) Patent No.: US 6,311,930 B1
(45) Date of Patent: Nov. 6, 2001

(54) ANTI-FRICTION RELEASE DEVICE

(75) Inventors: Michael J. Hersh, Bethesda; Edward J. Devine, Laurel, both of MD (US)

(73) Assignee: Swales Aerospace, Beltsville, MD (US)

(*) Notice: Subject to any disclaimer, the term of this patent is extended or adjusted under 35 U.S.C. 154(b) by 0 days.

(21) Appl. No.: 09/459,799

(22) Filed: Dec. 13, 1999

Related U.S. Application Data

(60) Provisional application No. 60/144,308, filed on Jul. 16, 1999.

(51) Int. Cl.$^7$ ................................................. B64G 1/44
(52) U.S. Cl. ............................ 244/158 R; 294/82.26; 244/173
(58) Field of Search ................... 244/158 R, 161, 244/173, 137.4; 318/562; 294/82.26, 82.32, 82.3; 24/648; 89/1.51, 1.58, 1.59

(56) References Cited

U.S. PATENT DOCUMENTS

| | | |
|---|---|---|
| 166,452 | 8/1875 | Brown et al. |
| 2,668,412 | 2/1954 | Abramson ..................... 60/39.14 |
| 3,992,257 | 11/1976 | van Erp et al. ................. 176/36 C |
| 4,347,023 | 8/1982 | Rizos ............................ 410/32 |
| 4,397,433 | 8/1983 | Guitaut et al. ............... 244/137 R |
| 4,419,033 | 12/1983 | Roth et al. .................... 410/32 |
| 4,682,804 | 7/1987 | Palmer et al. ............... 294/82.26 |
| 4,823,035 | 4/1989 | Kudla et al. .................. 310/68 C |
| 4,911,400 | 3/1990 | Gruber ........................... 251/11 |
| 5,025,627 | 6/1991 | Schneider ....................... 60/527 |
| 5,129,753 | 7/1992 | Wesley et al. ................. 403/322 |
| 5,221,171 | 6/1993 | Rudoy et al. .................. 411/433 |
| 5,377,554 | 1/1995 | Reulein et al. .................. 74/2 |
| 5,396,770 | 3/1995 | Petot et al. ..................... 60/531 |
| 5,600,220 * | 2/1997 | Thoraval et al. ................ 318/562 |
| 5,695,306 | 12/1997 | Nygren, Jr. ................... 411/433 |
| 5,771,742 | 6/1998 | Bokaie et al. ..................... 74/2 |
| 6,119,984 * | 9/2000 | Devine ........................ 244/158 R |

FOREIGN PATENT DOCUMENTS

| | | |
|---|---|---|
| 0 441 669 A1 | 8/1991 | (EP) . |
| 2135796A * | 9/1984 | (GB) . |
| 07-223595 | 8/1995 | (JP) . |

OTHER PUBLICATIONS

XP-000952209, M. Lucy Et Al. Report on Alternative Devices to Pyrotechnics on Spacecraft Sep. 1996 p. 1–20.
Nygren May 1995, 29$^{th}$ Aerospace Mechanisms Symposium "Development of a High Force Thermal Latch".

* cited by examiner

*Primary Examiner*—Galen L. Barefoot
(74) *Attorney, Agent, or Firm*—Roberts Abokhair & Mardula, LLC

(57) ABSTRACT

A pin puller combines an actuator with an anti-friction release mechanism, according to a bilaterally symmetric geometry. The anti-friction tension release mechanism ensures that only negligible friction forces need to be overcome to operate the tension release mechanism. Thus, the actuator is isolated from the large tension force that bears on the tension release mechanism. The bilateral symmetric aspect of the structure provides for mechanical redundancy, so that, in the event that one half of the pin puller fails, it is sufficient that the other half operate properly for the tension to be successfully released. This pin puller avoids premature release because it is not susceptible to static electricity or electromagnetic radiation. The pin puller also avoids generation of large shock waves due to its slow speed of operation and because of the gradual release interaction of mechanical parts within the anti-friction release mechanism.

20 Claims, 5 Drawing Sheets